June 27, 1961     W. T. RENTSCHLER     2,989,905
PHOTOGRAPHIC CAMERA WITH COUPLED EXPOSURE METER
Filed May 1, 1958
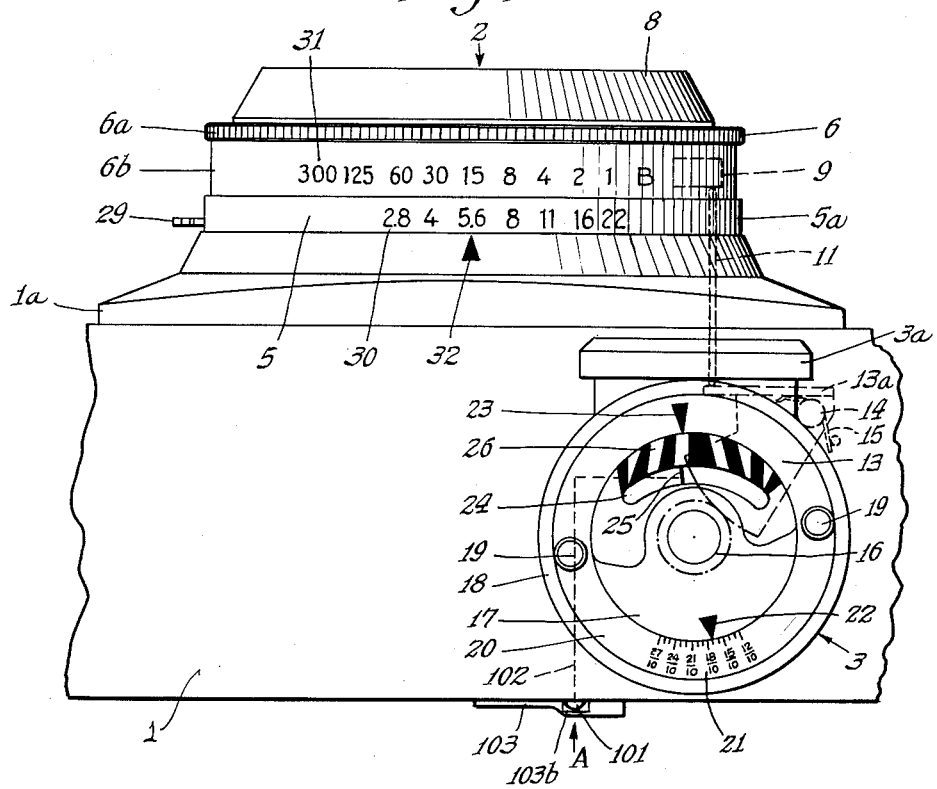
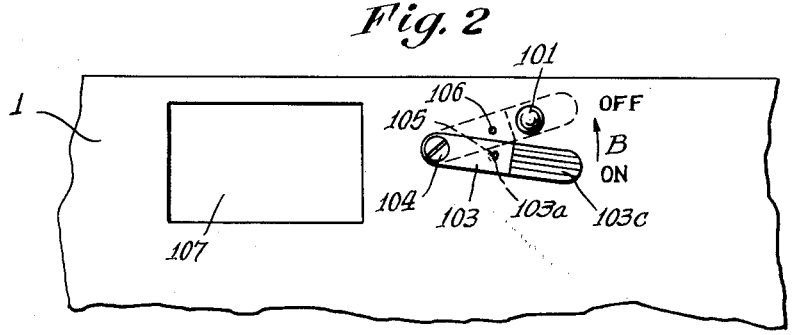
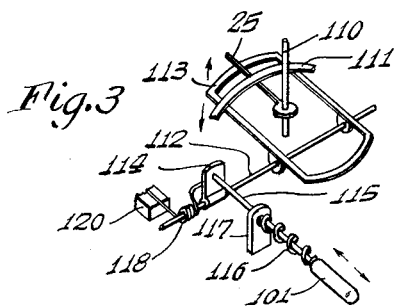
INVENTOR.
Waldemar T. Rentschler
BY
Munn, Liddy, Daniels & March
ATTORNEYS

United States Patent Office 2,989,905
Patented June 27, 1961

2,989,905
PHOTOGRAPHIC CAMERA WITH COUPLED EXPOSURE METER
Waldemar T. Rentschler, Calmbach (Enz), Germany, assignor to Alfred Gauthier G.m.b.H., Calmbach (Enz), Germany, a corporation of Germany
Filed May 1, 1958, Ser. No. 732,374
Claims priority, application Germany May 7, 1957
3 Claims. (Cl. 95—10)

This invention relates to photographic cameras having coupled electric exposure meters wherein there is a follower member which is influenced by adjustment of the diaphragm and speed setting members for the purpose of bringing the follower member into coincidence with the indicator of the exposure meter.

Various types of photographic cameras of the above type have been proposed in the past and are well known. These cameras have the advantage that through effecting a coincidence of the follower member with the indicator of the measuring device or instrument movement in the exposure meter diaphragm and speed setting members of the camera are automatically brought into the positions necessary for a proper exposure, this being accomplished without requiring calculations on the part of the user, or referring to charts and the like.

However, the simplicity and reliability made possible by this type of camera can be impaired and defeated if the operator ssould accidently shade or cover the photosensitive element of the exposure meter when he is making the adjustments of the setting members. As a general rule, such photo element is arranged at the front of the camera, where it is juxtaposed to the diaphragm and speed setting members which are actuated to set the camera for an exposure. It is thus extremely likely that an accidental shading or covering of the photo element would happen, either with or without the operator knowing about it, at the time that the setting members are adjusted to effect the coincidence of the exposure meter indicators. Such shading or covering of the photo element would then bring the indicator of the measuring device to an incorrect position which does not correspond to the actual conditions of lighting of the subject, and in consequence the operator would effect an incorrect adjustment or setting of the camera. Moreover, such covering or shading of the photo element in many cases causes an oscillation or swinging of the indicator of the measuring device, which then can become a source of annoyance, particularly when it is required that the pictures be taken quickly.

The above drawbacks and disadvantages of cameras of the said type having coupled exposure meters are obviated by the present invention, and one object of the invention is to provide an improved and simplified camera construction by which the adjustment of the setting members may be readily carried out to effect the necessary coincidence of the indicators, without the possibility that the light-responsive indicator of the meter would be positioned incorrectly due to shading or covering of the photo element.

This is accomplished, in accordance with the present invention, by the provision of a simple and reliably-operative releasable locking means which is adapted to hold and secure the movable indicator of the exposure meter in any of various adjusted positions as determined by the existing light conditions, prior to the adjusting of the setting members for diaphragm and speed.

With a camera constructed in accordance with the invention, the correct positioning of the exposure setting members in accordance with the picture-taking conditions can be effected at all times in a reliable and foolproof manner. It is merely necessary, in order to set the camera for an exposure, to initially release the said locking device which clamps the light indicator member or pointer, as by pressing a powered or spring-biased, momentary-type knob or pin inward, so that the said pointer or indicator is free to shift to the correct position corresponding to the existing light conditions. The locking device is now again made operative by releasing the knob or pin thereby enabling it to again clamp and hold the indicator or needle in its adjusted position as determined by the light conditions. Thereafter, the diaphragm and speed setting members of the camera may be properly adjusted to effect coincidence between the follower member controlled by said setting members and the indicator of the measuring device, without regard to whether or not the photo element is shaded or covered and without regard to how the camera is pointed or held. Any shading or covering of the photo element will not now effect a change in the position of the measuring device indicator, since it has already been previously clamped or fastened in the proper position as determined by the existing light conditions.

While it is already well known that manually held exposure meters which are separate from the camera may have their indicating needles releasably locked in adjusted position, or that exposure meters which for convenience are attached to the camera housing but which are not coupled with the setting members of the camera may have their indicating needles locked in adjusted positions, this is clearly different from the present inventive concept wherein the exposure meter is coupled with the setting members and a coincidence must be established between a follower member actuated by the setting members and the light-responsive indicator member or needle of the exposure meter. For such latter arrangement it was heretofore necessary, for a correct exposure, to adjust the setting members of the camera while at all times the indicator member of the exposure meter was correctly indicating the existing lighting conditions, and the act of adjusting the camera setting members was such as often to interfere with the proper transmission of light to the photo sensitive element of the exposure meter. With exposure meters which are not coupled to the camera setting members the light value may be read off at any time, without requiring that a correlation be effected while the light meter photo element is properly exposed to the full lighting conditions. Also, with uncoupled exposure meters it is possible to take so-called aimed exposure measurements, i.e. exposure measurements with the camera being kept in the same position and in the same observation angle as with the subsequent picture.

A well-known locking device may be employed to effect the said locking or clamping of the indicator member or needle of the meter, or other especially designed devices may be employed, if these are desired. Any such releasable clamping device incorporated in a photographic camera in combination with a coupled electric exposure meter having a follower member which is actuated in response to the shifting movements of the diaphragm and speed setting members represents a distinct advance and improvement in the art, enabling a result to be obtained which has essential and characteristic advantages. These advantages are, essentially, that in a photographic camera having a coupled electric exposure meter the operator may without calculations or attentiveness reliability effect the proper speed-diaphragm proportion corresponding to the existing picture taking conditions, in a most simple manner, without likelihood of error inconvenience due to shifting of the meter indicator, and without requiring that the camera be always held pointed at the subject. The special advantage of a camera as executed in accordance with the invention results from a new combination and interaction of known elements, i.e. the speed and diaphragm setting members, the coupled exposure meter with the follower member actuated in response to adjustment of the setting members, and the light-responsive indicator member of the meter, arranged for correlation with the follower member, said indicator member being associated wtih releasable locking means whereby it is adapted to be first clamped in a correct adjusted position indicative of the existing light conditions, prior to adjustment of the setting members. Also, in accordance with the invention, I provide in conjunction with the locking means, a novel, powered or spring-biased momentary-type knob or pin to effect clamping of the measuring device indicator, and further a simple latch or actuating member having different "on" and "off" positions, said latch member adapted to shift the knob and hold the same shifted when moved to the "off" position. Thus, in addition to a press-release or momentary action as provided by the knob or pin the operator may cause the releasable locking device to be maintained in either its operative or inoperative positions without continual pressure or attention.

My present improved camera structure as above set forth has great versatility in its use and application, since it not only allows the operator to either effect absolutely fool-proof exposure settings or else use the latching device to perceive immediately any rapid changes in the lighting conditions and to make the necessary corrections therefor, merely by placing the latching device in the "off" position whereby the locking device is inoperative, thus allowing the measuring device indicator to have free movement to respond to the varying conditions of light.

In the illustrated embodiment of the invention the member which actuates the locking means is advantageously constituted as a powered or spring-biased momentary-type or press-release push button, and the latch member is constituted as a one-armed lever movable between different "on" and "off" positions and adapted when the "off" position to depress and maintain depressed the push button. Such depression of the push button inactivates the locking means and frees the measuring device indicator to enable it to respond to the lighting conditions existing.

In the drawings, the camera in which the invention is embodied is of the intra-lens shutter type.

FIG. 1 is a top plan view of a photographic camera with coupled electric exposure meter and releasable locking device for the indicator thereof, as provided by the invention. The exposure meter has a follower member which is actuated in response to adjustment of the diaphragm and speed setting members of the camera, and which may be brought into coincidence with the indicator of the measuring device to effect the proper adjustment of the camera. Any well-known type of releasable locking or clamping means may be employed to clamp the indicator member of the exposure meter, and one specific clamping or locking construction is described herein.

FIG. 2 is a fragmentary rear elevational view of the camera of FIG. 1, showing the latching lever associated with the push button control of the releasable locking means.

FIG. 3 is a diagrammatic perspective view of one type of releasable locking or clamping means for holding the measuring device indicator member or needle fixed after it has been made releasable initially to respond to the existing lighting conditions.

Referring first to FIG. 1, the housing or casing of the camera is indicated by the numeral 1. The housing 1 has a front plate 1a on which a photographic intra-lens shutter structure 2 is mounted in the well-known manner. At the top of the housing 1 there is provided an exposure meter 3, which has a photosensitive element 3a disposed adjacent the front plate 1a of the camera, and also a measuring device or instrument movement which may be built into the casing 1 or arranged thereon in any suitable manner.

The intra-lens shutter 2 may be of any well known construction. At its rear it has a diaphragm setting ring 5, including a cylindrical mantle 5a. Bordering and in front of the mantle 5a is a cylindrical mantle 6b of a speed setting ring or member 6 which latter is arranged at th efront of the intra-lens shutter housing. The speed setting ring 6 may be actuated by means of a kurled rim 6a, in the usual manner. Also, the speed setting ring 6 may be held in place by a conical front plate 8, which in turn is secured to the intra-lens shutter structure by well-known means.

In conjunction with the diaphragm setting member 5 and speed setting member 6, I provide a coupling or transmission device by which the adjusting movement of such members may be made to actuate a follower member of the measuring device 3 through the pin 11, and details of such coupling or transmission means may be had by referring to copending application Serial No. 639,993 of F. W. R. Starp, owned by the same assignee as the present application, filed February 13, 1957 and entitled Photographic Intra-lens Shutter and Coupled Exposure Meter. The coupling or transmission means as provided in this copending application includes a transmission or cam ring 9 which is connected with the setting rings 5 and 6 and is axially shiftable in response to turning, adjusting movements of the speed and diaphragm setting members 6 and 5. The exact construction by which the cam or transmission ring 9 is connected with the setting rings 5 and 6 forms no part of the present invention, and accordingly further details are not given herein.

As is well known, the setting rings 5 and 6 may be connected with each other by means of a releasable coupling or latch device, which when in released position allows independent movement or adjustment of each of the two rings. The speed-diaphragm coupling or latching means, referring to FIG. 1, includes an actuating handle 29 which is disposed adjacent the diaphragm setting ring 5, protruding from the circumference of the cylindrical mantle 5a of such ring. The diaphragm setting ring 5 has a scale 30 carried on the mantle 5a thereof, and a speed scale 31 is disposed on the cylindrical mantle 6b of the speed setting 6. Both scales are adjustable with respect to an index mark 32 which is fixed on the camera or shutter structure.

The axial shifting movement of the transmission ring 9 is transmitted to the follower member of the exposure meter by means of a cylindrical, axially movable pin 11 carried by the camera. The pin 11 is shiftable in a direction parallel to the optical axis of the camera, and under the action of a spring 15 the pin 11 is held upward as seen in FIG. 1, by a lug 13a of a toothed segment 13 which is pivotally carried on a spindle 14. Such upward bias of the pin 11 maintains the upper extremity thereof, as viewed in FIG. 1, in engagement with the cam ring 9, as will be understood. It will be seen that the lug 13a of the toothed segment 13 is disposed in a plane which is substantially parallel with that of the film in the camera. The toothed segment 13 is biased clockwise by the spring 15, and engages a gear or pinion 16 which latter is connected with a disc-shaped carrier segment 17 of the measuring device, such segment having a flat ring 18 adapted to move therewith. The ring 18 in turn carries a second flat ring 20 which is mounted for relative turning movement on the ring 18 and is shiftable by means of two finger-engageable pins 19. The ring 20 has a film sensitivity scale 21 as shown in FIG. 1, said scale being cooperable with an index or setting mark 22 carried by the carrier segment 17. Also, the flat ring 20 carries an index mark 23 which cooperates with the indicator member 25 of the measuring device. Such indicator member or needle is movable in an arcuate path under a window 24, and to obtain a linear characteristic where the measuring device does not have a logarithmic characteristic, a channel scale 26 is provided between the window 24 and the inner periphery of the flat ring 20. Such channel scale facilitates the matching of the index mark 23 with the indicator needle 25, as is readily understood.

Thus, as shown in the embodiment of the invention illustrated herein, the follower member of the exposure meter comprises the parts 17, 18 and 20, and also the mark 23 which is carried by the ring 20. Instead of the construction shown, it will be understood that the follower member may be constituted in another well-known manner as an indicator which is to be actuated by a cam which is driven in response to the movement of the diaphragm and speed setting members 5 and 6.

In accordance with the present invention, I provide in conjunction with the measuring device 3 a powered releasable locking means by which the indicator member or needle 25 of the measuring device may be clamped or held in any adjusted position as initially effected by the existing light conditions.

FIGURE 3 illustrates one construction which may be used for the releasable locking device, although it should be understood that the invention is not to be restricted to any particular construction, since other structures well known in conjunction with electrical measuring devices may be employed instead. In FIG. 1 the releasable locking means of FIG. 3 is indicated schematically by the dotted line 102, which connects the measuring device indicator member or needle 25 with a spring-loaded push button 101 which is disposed at the rear upper portion of the camera housing 1. If the push button 101 is depressed, that is, shifted upward as seen in FIG. 1, this operates to release the indicator needle 25 so that it may respond to the existing light conditions and assume a proper arcuate position somewhere within the range of the window 24. If, however, the push button 101 is not depressed, the locking device which clamps the needle 25 is allowed to be operative, whereby it clamps the needle in any adjusted position and maintains such position regardless of changing light conditions. Therefore, it will be understood that the releasable locking device is operative when the button 101 is not depressed, and is inoperative when the button 101 is depressed.

For the purpose of holding the releasable locking device in its inoperative position without continuously manually depressing the push button 101, I provide a simple and advantageous latching member or lever 103 which is pivoted by means of a spindle 104 on the rear exterior surface of the camera housing 1 at the upper portion thereof, adjacent the push button. The lever 103 may be provided with a detent rivet or lug 103a, adapted to be received in recesses 105 and 106 provided in the camera housing 1. By such organization the lever 103 may be retained in either of two positions, an "on" position shown in full lines in FIG. 2 wherein it does not engage the push button 101, and an "off" position shown in broken outline in FIG. 2, wherein the lever engages and continually depresses the push button 101.

While FIG. 2 illustrates the two positions of the latching lever 103, FIG. 1 illustrates a camming surface 103b which is provided on the inner side of the lever 103, for engagement with the push button 101 to depress the latter when the lever is swung about its pivot to the "off" position. For convenience in actuating the lever 103 it may be provided with a ribbed surface 103c as shown.

It will be readily understood from the above construction that the latching lever 103 is at one end and the same time extremely simple and also completely reliable and fool-proof in its operation. It is moreover inexpensive to produce, and to apply to the camera housing.

Referring now to FIG. 3 there is illustrated one type of releasable locking or clamping means, by which the indicator needle 25 of the measuring device may be made to hold any adjusted position which it has assumed in response to existing light conditions. The needle 25, which is preferably thin and flexible, is shown as being mounted on a spindle 110, which constitutes the shaft of the measuring device or instrument movement. Above the needle 25 there may be disposed an arcuate, stationary member 111 against which the needle may be pressed without permanently deforming the latter. Fixedly secured to a spindle 112 is a bail 113 adapted to extend below the needle 25 in closely spaced relation thereto. The spindle 112 has an actuating lug 114 engageable by one end of a pin 115 which carries the push button 101. A spring 116 on the pin 115 engages the push button 101 and also a fixed abutment 117 in the camera housing, thereby to normally urge the push button 101 and the pin 115 in a direction outward of the casing, or downward as viewed in FIG. 1. On the spindle 112 there is disposed a coil spring 118 engaging the lug 114 and also engaging a fixed abutment 120, by which the spindle 112 is biased clockwise as viewed from the left end thereof, see FIG. 3. With this organization the bail 113 is normally held in engagement with the needle 25, pressing the latter against the upper fixed or stationary arm 111 whereby the needle 25 is prevented from moving. Whenever the push button 25 is depressed it will actuate the lug 114 and drive the spindle 112 counterclockwise as viewed from the left end thereof, thereby lowering the bail 113 and freeing the needle 25 so that it may respond to the existing light conditions. It will, of course, be understood that other types of releasable locking means may be employed, different from that shown in FIG. 3, without departing from the spirit of the invention. As seen in FIG. 2, a well-known view finder window 107 is arranged at the rear upper portion of the camera housing 1.

The procedure of setting the camera for an exposure is briefly as follows:

(1) Setting the film sensibility.

For this purpose the ring 20 of the exposure meter follower member is displaced or adjusted until the setting mark 22 points to that value on the scale 21 which corresponds to the sensibility of the film used. Film sensibility must be adjusted in only those cases where a film is used which has a different sensibility from the one previously used.

(2) Setting the speed-diaphragm proportion corresponding to the exposure meter indications.

A. The camera is first pointed at the object to be photographed and then the push button 101 is depressed or shifted upward as viewed in FIG. 1 and indicated by the arrow A. This frees the measuring device indicator member or needle 25, and allows such member to respond to the light conditions which are "seen" by the photo element 3a. When the needle 25 has come to rest at the proper position, the push button 101 is released, this act causing the locking means for the needle to become operative whereby the needle is securely clamped between the bail 113 and the arm 111, as seen in FIG. 3. Any changes in the light conditions will not now effect or shift the needle 25, and thus when the operator is setting or adjusting the speed and diaphragm setting members if he should accidentally cover or shade the photo element 3a it would not cause an incorrect positioning of the needle 25. Instead, the said needle will remain in its correct position regardless of accidental covering of the photo element.

B. Now the index mark 23 of the follower member 17, 18, 20 is moved or shifted to bring it into coincidence with the needle 25. This may be accomplished optionally either by shifting the diaphragm setting ring 5, or by shifting the speed setting ring 6. To effect such shifting of the setting rings the actuating handle 29 of the coupling device between the rings must first be depressed to release the said coupling. It has already been mentioned above that when shifting the rings 5 and 6, the transmission ring 9 is shifted axially (either up or down as viewed in FIG. 1), thereby resulting in an axial movement of the follower pin 11 which constitutes part of the coupling, or transmission to the exposure meter.

(3) Diaphragm speed selection.

Selecting a proper diaphragm-speed pair value which is suitable for the object which is to be photographed is done by turning the coupled setting rings. That is, the actuating handle 29 of the coupling device is released, thereby locking the rings 5 and 6 together, and such rings are then adjusted to suit the particular subject which is to be photographed. This simultaneous adjustment of the coupled rings 5 and 6 will not cause any axial shifting of the transmission ring 9, and therefore there will be no shifting of the pin 11 nor any shifting of the index mark 23 which has been brought into coincidence with the measuring device pointer 25.

It will now be seen from the foregoing that I have provided a novel and improved photographic camera having a semi-automatic exposure setting which is characterized by the greatest simplicity and reliability. With the construction shown correctly exposed pictures will be obtained at all times, without the operator giving particular attention or care to the location of the photosensitive element 3a at the time that he adjusts the setting members 5 and 6, and without the operator having recourse to computations or other mental figuring or the like because of the coupled exposure meter. The above advantageous object is the result of the fact that the measuring of the existing light conditions is done independently of the settings of the diaphragm and speed setting members, as distinguished from prior cameras wherein the adjustment of the setting members and the measuring of the light conditions is done simultaneously. By the present construction there is no interference between the operation of measuring for the light conditions, and setting for the speed and diaphragm. Instead, these two procedures are done separately and related to each other in a way to insure the highest accuracy by simply bringing the mark 23 in coincidence with the needle 25.

The present invention is of particular importance in cameras where, because of small space or size, the photo element 3a is located closely adjacent the speed and diaphragm setting members 6 and 5, so that there is great likelihood of the photo element being shaded or covered during adjustment of the said setting members. With a camera constructed in accordance with the present invention, however the exposure setting members are adjusted only after the measuring of the existing light conditions has been completed, and after the indicator member or needle 25 of the measuring device has been fixed in its adjusted position by the releasable locking means shown in FIG. 3. Also, the adjustment of the diaphragm and speed setting members may be carried out without regard to shading or covering of the photo element 3a.

There is also an additional advantage with the camera of the present invention. For example, if there is any change in the position of the camera during the adjustment of the speed-diaphragm proportion, this will not change the setting or position of the indicator member or needle 25 of the measuring device. Thus, it is not necessary for the operator to keep the camera pointed at all times in the picture-taking direction and to make sure that there is no change in the position of the camera during the shifting or adjusting movement of the setting members. The operator may keep the camera in that position found most convenient and suitable to him for adjusting the setting members, and he may effect such adjustment by an operation which seems to be easiest and quickest in order to obtain the coincidence between the follower member or index mark 23 and the exposure meter or indicator needle 25. With this arrangement there is eliminated all factors which might cause inaccuracy during the setting operation of the camera, and actually the speed-diaphragm proportion corresponding to the picture taking positions can be adjusted most easily and in a fool-proof manner. The only condition that is necessary after the camera has first been pointed at the object and the needle 25 fixed in its proper position, is for the operator to cause coincidence between the mark 23 and the needle 25, regardless of how the camera is held and regardless of what light conditions are imposed on the photo element 3a.

As already stated above, in further execution of the invention the latching lever 103 is provided, by which the releasable locking means may be rendered inoperative at any time, as desired by the operator. This results in a further advantage, since he now has at his disposal either one of two arrangements and use that which he considers of best advantage for the picture-taking situation. For, in addition to the already-mentioned advantages, a camera of the above type as provided by the invention has the further advantage that the locking device may be shut off or rendered inoperative for any desired period of time, without requiring continual manual pressure on the button 101. I have found to be most convenient the provision of the depressible button 101 which, when not depressed, automatically locks the indicator needle. This enables the operator to very easily set the needle in accordance with the light conditions, by merely freeing the needle with a simple, quick pressure and then after the needle has come to rest, removing the pressure so as to lock the needle, whereupon the light factor or adjustment may be forgotten. There is only required further the bringing of the mark 23 in coincidence with the needle 25. The depress-to-release character of the locking arrangement makes for a maximum convenience in use of the exposure meter. At the same time, keeping such convenience of operation, I am enabled to inactivate the lock for any desired period without maintaining pressure on the button 101, and in many situations this may be found to be most convenient or desirable. This is accomplished, in the embodiment of the invention, by merely moving the lever 103 in the direction of the arrow B in FIG. 2, from the full-line position shown therein to the broken-line position. Now the indicating needle 25 of the measuring device is free to move throughout its scale, and it can immediately indicate any change in the illumination of the subject or changes in the lighting conditions affecting the subject. Also, it will indicate immediately the lighting of different objects which are sighted in quick succession. By this arrangement it is possible for the operator to constantly readjust the follower member 23 of the exposure meter and bring the same in coincidence with the different settings of the needle 25, thereby to at once adapt the speed-diaphgram proportion to the different conditions of lighting. For such operation of the camera, however, care and attention must be given to the location of the photo element 3a, so that it is not by mistake partially or even completely covered or prevented from functioning or responding to the existing lighting conditions. Incorrect exposures might result and go unnoticed, if the photo element 3a is for example slightly shaded, or if the camera position should be changed from that which is proper for the particular subject being photographed.

With the organization as provided by the invention and illustrated herein, the operator may always apply that method for any particular situation, which seems to him most advantageous. That is he may apply the first-mentioned fool-proof method by which light conditions are initially measured and the indicator fixed and thereafter the setting members adjusted, or the second method wherein the conditions of illumination are constantly traced and checked and the setting members adjusted accordingly.

In the illustrated embodiment of the invention the indicator member or needle 25 of the measuring device is the part that is locked, said needle being directly connected with the movable portion of the measuring device. It will be understood however that the needle might be indirectly connected with the movable portion or coil of the measuring device. Also, the movable portion or coil might be arranged in a manner where it would be locked, and might have other means by which its position could be traced by the index mark 23 or an equivalent thereof. Further, instead of the indicator shown another means, as for example a turnable disc with a mark, could be arranged for indicating purposes.

I claim:

1. In a photographic-camera, diaphragm and speed setting members disposed at the front of the camera; an electric exposure meter having a light cell facing forwardly of the camera and disposed adjacent and to the rear of the said setting members whereby the normal actuation of said members by the fingers is likely to cause the hand to cover the light cell, said meter also having a movable indicator responsive to conditions of light, and having a follower member movable into coincidence with said indicator for any of various positions of the latter; means coupling said diaphragm and speed setting members to the follower member to effect a predetermined positioning of the latter in response to adjustment of said setting members; and normally operative powered means independent of the shutter release and operative for releasably locking the movable indicator in any of various positions thereof as determined by the said light conditions.

2. The invention as defined in claim 1 in which there is a manually operable movable member having different "on" and "off" positions, and in which there are means for actuating said releasable locking means to render the same operable or inoperable in response to shifting said manually operable member respectively between "on" and "off" positions.

3. The invention as defined in claim 2 in which the releasable locking means comprises a spring-charged push button movably mounted on the camera, and in which the manually operable member comprises a one-armed lever engageable with the push button to maintain the latter in depressed position.

References Cited in the file of this patent

UNITED STATES PATENTS

| | | |
|---|---|---|
| 2,148,963 | Rauch | Feb. 28, 1939 |
| 2,188,820 | Riszdorfer | Jan. 30, 1940 |
| 2,206,626 | Blechner | July 2, 1940 |
| 2,325,463 | Axler | July 27, 1943 |
| 2,341,393 | Simmon | Feb. 8, 1944 |
| 2,467,946 | Rossmann | Apr. 19, 1949 |
| 2,838,985 | Burger | June 17, 1958 |
| 2,849,936 | Fahlenberg | Sept. 2, 1958 |
| 2,868,095 | Gebele | Jan. 13, 1959 |